United States Patent
Lee et al.

(10) Patent No.: US 6,853,157 B2
(45) Date of Patent: Feb. 8, 2005

(54) IMAGE DISTORTION COMPENSATING APPARATUS WITH LOW SWITCHING DELAY

(75) Inventors: Kyoung-geun Lee, Suwon (KR); Chung-wook Roh, Seoul (KR); Joon-hwan Lee, Gunpo (KR)

(73) Assignee: Samsung Electronics Co., Ltd., Gyunggi-Do (KR)

( * ) Notice: Subject to any disclaimer, the term of this patent is extended or adjusted under 35 U.S.C. 154(b) by 0 days.

(21) Appl. No.: 10/618,817

(22) Filed: Jul. 15, 2003

(65) Prior Publication Data

US 2004/0012348 A1 Jan. 22, 2004

(30) Foreign Application Priority Data

Jul. 15, 2002  (KR) .......................................  2002-41370

(51) Int. Cl.[7] ................................................. H01J 29/51
(52) U.S. Cl. .................. 315/368.11; 315/387; 348/241; 348/806
(58) Field of Search ................................. 315/366, 370, 315/371, 387, 368.11; 348/241, 607, 806, 807, 242

(56) References Cited

U.S. PATENT DOCUMENTS 4,176,300 A  * 11/1979  Waehner ..................... 315/371
4,961,030 A  * 10/1990  Ogino et al. ............ 315/368.23
5,414,330 A  *  5/1995  Tsujihara et al. ........... 315/371
5,532,765 A  *  7/1996  Inoue et al. ................. 348/807

FOREIGN PATENT DOCUMENTS

JP          10-164385        *  6/1998

* cited by examiner

Primary Examiner—Thuy Vinh Tran
(74) Attorney, Agent, or Firm—Sughrue Mion, PLLC

(57) ABSTRACT

An image distortion compensating apparatus controls a convergence yoke, and includes a compensation value generator for calculating a convergence compensation value for compensating a convergence distortion which occurs while an image signal is emitted onto a display apparatus, the compensation value generator outputting the convergence compensation value after compensating for a phase and a gain of the convergence yoke; an amplifier for D-class amplifying of the convergence compensation value; and a convergence yoke attached to the display apparatus for controlling a path of electron beams corresponding to the image signal, based on the convergence compensation value as amplified at the amplifier. In the image distortion compensating apparatus used for the image display apparatus such as projection television, there is provided a D-class amplifier with high power efficiency and low heat generation, while through the two-pole and one-zero controlling, the switching delay and noise of the D-class amplifier is greatly reduced.

8 Claims, 9 Drawing Sheets

IMAGE DISTORTION COMPENSATING APPARATUS WITH LOW SWITCHING DELAY

BACKGROUND OF THE INVENTION

1. Field of the Invention

The present invention generally relates to an image distortion compensating apparatus that controls a convergence amplifier, and more particularly to an image distortion compensating apparatus which reduces phase delay and noise which occur during use of a D-class amplifier. The present invention is based on Korean Patent Application No. 2002-41370, which is incorporated herein by reference.

2. Description of the Related Art

Generally, an image display apparatus such as a projection television realizes one complete image through the process of focusing images of red, blue and green images projected on a cathode ray tube (CRT). In order to focus the red, blue and green images on one spot of the CRT, a predetermined degree of electric current is applied to convergence yoke coils attached to the CRT. That is, by the predetermined electric current as applied, the magnetic field of the convergence yoke coils vary to focus the images on the CRT in one spot, and this process is usually called a 'convergence compensation'. For the purpose of convergence compensation, A-, B- and C-class analogue amplifiers are generally provided to amplify the pulse signal and drive the convergence yoke coils.

FIG. 1 is a view illustrating a conventional image distortion compensating apparatus.

As shown, the conventional image distortion compensating apparatus includes an image signal processor 11, a compensation value generator 12, an operational amplifier 13, a feedback resistor 14 and a convergence yoke 21 built in the CRT 20.

The image signal processor 11 processes an externally-received broadcasting signal, and outputs vertical and horizontal synchronization signals. The image signal processor 11 outputs the image signal to the CRT 20 and outputs the vertical and horizontal synchronization signals to the compensation value generator 12.

The compensation value generator 12 calculates a convergence compensation value based on the horizontal and vertical synchronization signals for convergence compensation of the image signal. That is, each horizontal synchronization signal of the CRT 20 screen is combined with a predetermined image distortion compensation value and an input voltage from the feedback resistor 14, and as a result, the convergence compensation value is outputted.

The operational amplifier 13 amplifies the convergence compensation value to a high-power signal. Generally, a convergence yoke coil 21a built in the convergence yoke 21 is driven by the high voltage high current to form a magnetic field, and the path of the electron beam changes due to the magnetic field as formed. Accordingly, there are mainly A-, B- and C-class amplifiers for linear-amplifying the voltage, and one of these is used as the operational amplifier 13. The feedback resistor 14 feeds back the voltage of the electric current flowing in the convergence yoke coil 21a toward the operational amplifier 13, thereby properly varying the amplitude of the operational amplifier 13. Meanwhile, a power transistor is used as an amplifier end for the A-, B- and C-class amplifiers for the purpose of amplifying electric current and voltage. Although the power transistor has fast response and small noise during feedback of the output voltage, by its nature as an electric-driven element, it has high turn-on resistance and power consumption. Usually, electric power efficiency of the power transistor is not more than 50%, so the rest of the power is converted into heat. This causes one disadvantage of the operational amplifier 13 including A-, B- and C-class amplifiers that a huge heat sink has to be prepared for the power consumption. Accordingly, volume and weight of the image display apparatus increases, and heat generated from the heat sink deteriorates safety of the system.

In order to resolve the above-mentioned problem of the prior art, the same applicant disclosed "image distortion compensating apparatus capable of compensating for a convergence distortion by using D-class amplifier" in Korean Patent Application No. 10-2002-0024207. In KR 10-2002-0024207, a D-class amplifier is adopted as an image distortion compensating apparatus which amplifies in response to a digital pulse signal. Because the D-class amplifier has 90% power efficiency, heat generation is greatly reduced. Accordingly, only a compact-sized heat sink is required, and the size of the image distortion compensating apparatus employing the D-class amplifier can subsequently have a reduced size, while it has increased power efficiency. However, there is one problem of the D-class amplifier. That is, because D-class amplifiers amplify based on the working principle that NMOS transistors are alternately turned on/off, the D-class amplifier requires a predetermined time interval before its output end reaches a predetermined level of electric potential from the time point when the NMOS transistors are turned on/off. This causes a switching delay, which subsequently lengthens a response time during controlling on the convergence yoke with the signals as delayed.

Referring to FIG. 2, the D-class amplifier will be described in detail.

The D-class amplifier consists of two NMOS transistors 31, 32 responding to pulses having a predetermined amplitude and duty ratio. The D-class amplifier performs switching operation by alternately turning on in response to two pulses of identical duty ratio and amplitude but opposite phases. Here, as described above, a predetermined time is required from the time point of alternate turn-on until the output voltage Vout reaches logic 'high' or logic 'low'.

FIG. 3 is a waveform for illustrating the relation between the input and output waves of the D-class amplifier of FIG. 2.

As shown, the waveform Iout of the output voltage from an output end Vout of the D-class amplifier in response to the input pulse CMD is delayed for a predetermined time period. At an "A"-zone, the input pulse CMD maintains a predetermined phase level, while the output voltage Iout of the D-class amplifier is in the transition to a predetermined electric level. Accordingly, the controlling on the convergence yoke coil 21a is delayed in accordance with the output delay of the D-class amplifier.

SUMMARY OF THE INVENTION

Accordingly, it is an aspect of the present invention to provide an image distortion compensating apparatus which minimizes a switching delay of a D-class amplifier.

In order to accomplish the above aspects and/or features of the present invention, an image distortion compensating apparatus which controls a convergence yoke includes a compensation value generator for calculating a convergence compensation value for compensating a convergence distortion which occurs while an image signal is emitted onto a display apparatus, the compensation value generator outputting the convergence compensation value after compensating for a phase and a gain of the convergence yoke, an amplifier for a D-class amplifying of the convergence compensation value, and a convergence yoke for controlling a path of electron beams corresponding to the image signal, based on the convergence compensation value as amplified at the amplifier.

The compensation value generator includes a convergence module for synchronizing to a horizontal and a vertical synchronization signal applied to the display apparatus and outputting a predetermined convergence distortion value, a triangular wave generator for generating a triangular wave, a combiner for combining the convergence distortion value and an output from the feedback sensor, a comparator for comparing the convergence distortion value outputted from the combiner with a phase level of the triangular wave, and a pulse generator for generating the convergence compensation value in the form of a pulse width modulating signal based on the comparison result from the comparator.

The combiner includes a first resistor for being inputted with an output from the feedback sensor, an operational amplifier for being inputted with an output from the first resistor as a negative input and the convergence distortion value as a positive input, a second resistor and a first capacitor, both of which are connected in series between a negative input terminal and an output terminal of the operational amplifier, and a second capacitor and a third resistor, both of which are connected in parallel between the negative input terminal and the output terminal of the operational amplifier.

The combiner has the control characteristic of 2-pole and 1-zero.

The combiner has a transfer function of, $$H(S) = \frac{Z3}{R1} = \frac{R3 \cdot R2 \cdot C1S + R3}{R1 \cdot R2 \cdot R3 \cdot C1 \cdot C2S^2 + (R1 \cdot R3 \cdot C2 + R1 \cdot R2 \cdot C1 + R1 \cdot R3 \cdot C1)S + R1}$$

Further provided is a feedback sensor provided between the convergence yoke and the compensation value generator, for reducing a noise outputted from the convergence yoke through a differential amplification.

Further provided is a low pass filter provided between the amplifier and the convergence yoke, for reducing the noise of the amplifier by a predetermined amount in accordance with a predetermined value.

According to the present invention, an image distortion compensating method for controlling a convergence yoke includes the steps of calculating a convergence compensation value for compensating a convergence distortion which occurs while an image signal is emitted onto a display apparatus in consideration of a phase and a gain of the convergence yoke, D-class amplifying in response to the convergence compensation value, and forming a predetermined magnetic field by the D-class amplification, and controlling a path of electron beams corresponding to the image signal by the magnetic field as formed.

Further provided is the step of removing a noise from an electric current forming the magnetic field.

The step of D-class amplifying further includes the step of low pass filtering the amplified convergence compensation value.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENTS

Hereinafter, the present invention will be described in detail with reference to the accompanying drawings.

Figure 1:
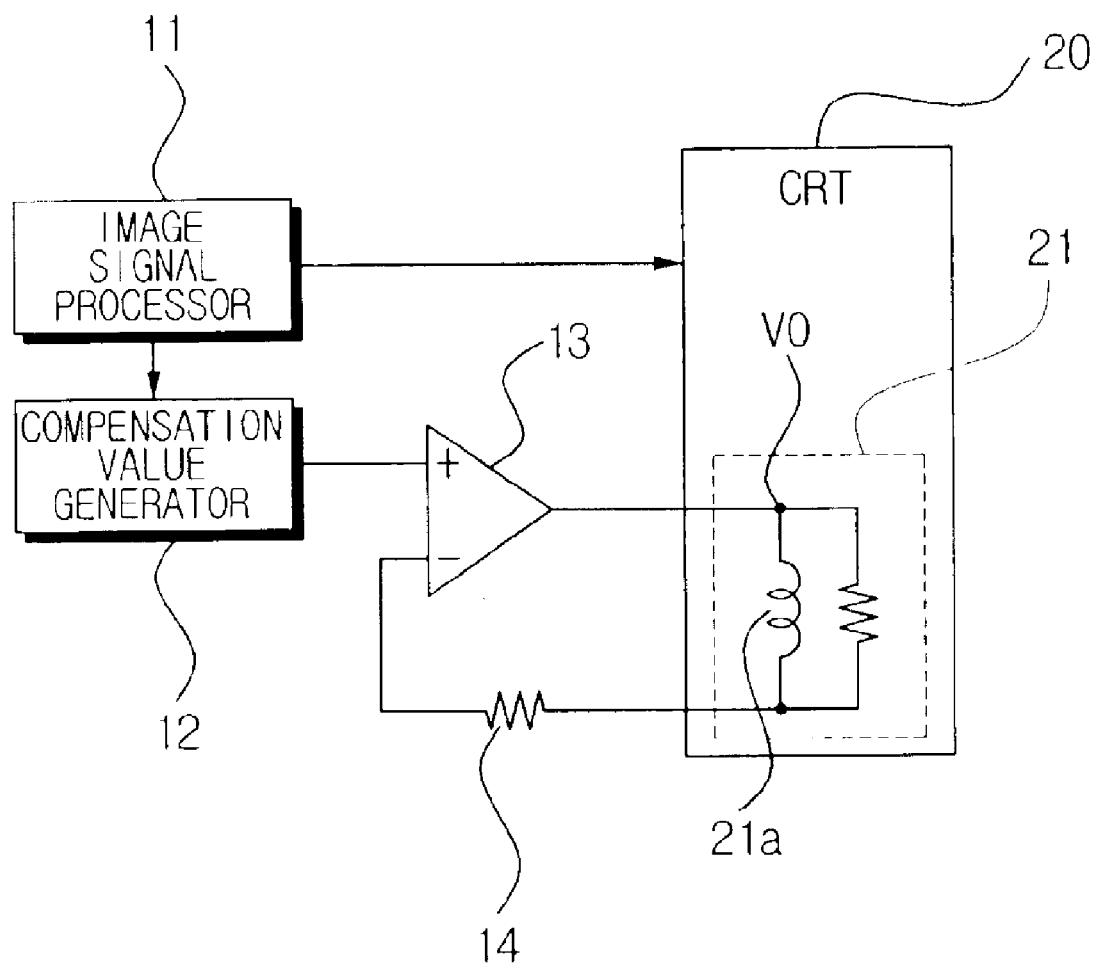
FIG. 1 is a view illustrating a conventional image distortion compensating apparatus.
Figure 2:
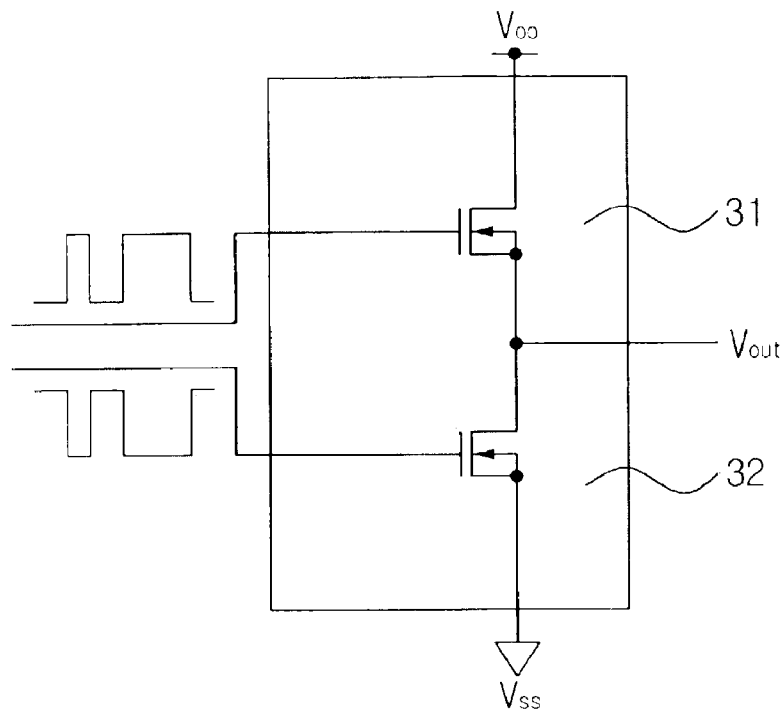
FIG. 2 is a view for illustrating a concept of the D-class amplifier.
Figure 3:
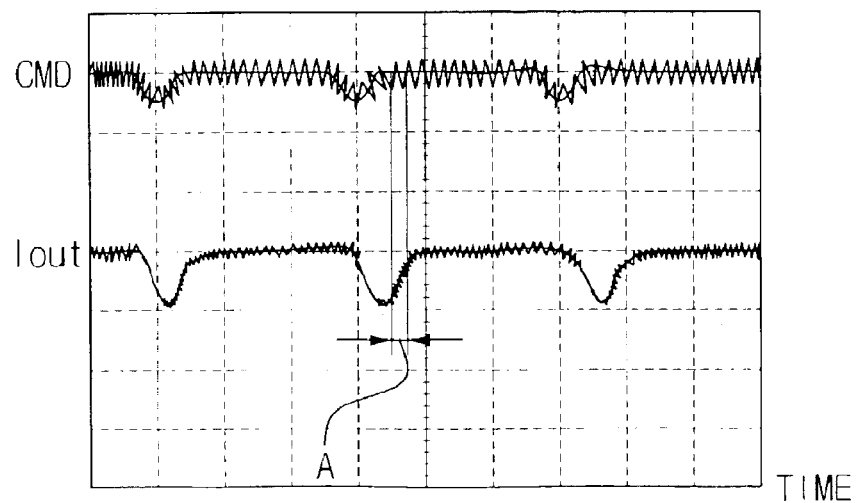
FIG. 3 is a waveform illustrating the relation between the input and output waves of the D-class amplifier of FIG. 2.
Figure 4:
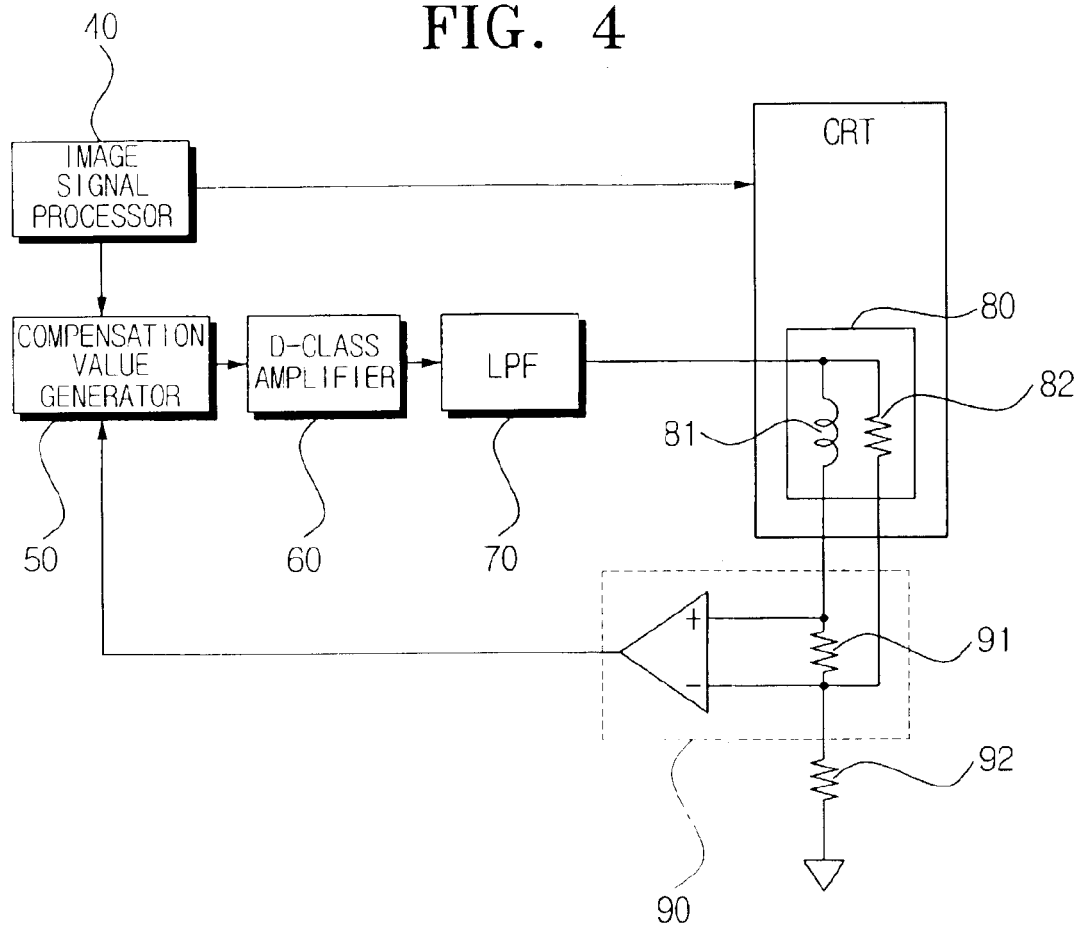
FIG. 4 is a view illustrating an image distortion compensating apparatus having a compensation value generator according to a preferred embodiment of the present invention.

FIG. 4 is a view illustrating an image distortion compensating apparatus having a compensation value generator according to a preferred embodiment of the present invention.

The image distortion compensating apparatus includes an image signal processor 40, a compensation value generator 50, a D-class amplifier 60, a low-pass filter (LPF) 70, a convergence yoke 80 and a feedback sensor 90.

The image signal processor 40 detects an image signal, a vertical and a horizontal synchronization signal from an externally received broadcasting signal. The detected image signal is transmitted to the CRT having the convergence yoke 80 built therein and displayed on the screen, while the detected horizontal and vertical synchronization signals are output through the compensation value generator 50.

The compensation value generator 50 outputs a predetermined pulse width modulating signal for driving the D-class amplifier 60 which performs amplification by switching operation. The output pulse width modulating signal is synchronized to the vertical and horizontal frequencies outputted from the image signal processor 40, and outputted.

The D-class amplifier 60 performs D-class amplification in response to the pulse width modulating signal outputted from the compensation value generator 50.

The low-pass filter (LPF) 70 reduces high frequency switching noise outputted from the D-class amplifier 60.

The convergence yoke 80 is attached to the CRT to focus RGB images on the image display apparatus such as projection television, and applies a predetermined magnetic field to the CRT in response to the voltage and electric current outputted from the D-class amplifier 60. As a result, the trajectories of the R, G, B images from each CRT are compensated.

The feedback sensor 90 differentially amplifies the voltage of the electric current outputted from the convergence yoke 80, thereby removing a switching noise which has not been removed at the low-pass filter (LPF) 70. As the feedback sensor 90 feeds back the noise-free voltage toward the compensation value generator 50, the compensation value generator 50, the mal-operation of the compensation value generator 50 due to switching noise is avoided.

Figure 5:
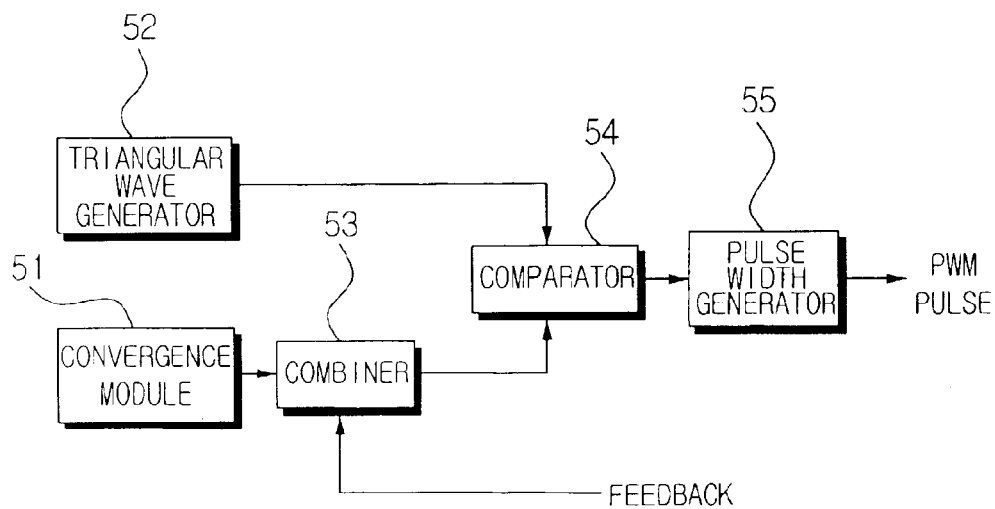
FIG. 5 is a view illustrating the compensation value generator of FIG. 4 in detail.

FIG. 5 is a view illustrating in detail the concept of the compensation value generator 50 of FIG. 4.

As shown, the compensation value generator 50 includes a convergence module 51, a triangular wave generator 52, a combiner 53, a comparator 54 and a pulse wave generator 55.

The convergence module 51 in synchronization with the horizontal and vertical synchronization signals outputted from the image signal processor 40 outputs a predetermined convergence distortion value. The "predetermined convergence distortion value" represents the convergence distortion of the image display apparatus such as a projection television, and is calculated in advance. Preferably, the output waveform of the convergence distortion value from the convergence module 51 has a parabolic shape.

The triangular wave generator 52 outputs triangular waves in accordance with a predetermined frequency and amplitude.

The combiner 53 combines the convergence distortion value outputted from the convergence module 51 with a voltage from the feedback sensor 90. Before the output, the combiner 53 performs compensation in consideration of the phase and gains of the convergence yoke 80. This process of compensating based on the phase and gain characteristics of the convergence yoke 80 will be described later.

The comparator 54 compares the convergence distortion value from the combiner 53 with the phase level of the triangular wave.

Depending on the comparison result of the comparator 54, the pulse wave generator 55 generates a pulse width modulating signal PWM having a predetermined amplitude and periodicity. The pulse width modulating signal is input to the D-class amplifier 60, and accordingly amplified in accordance with the predetermined amplitude of the D-class amplifier.

Figure 6A:
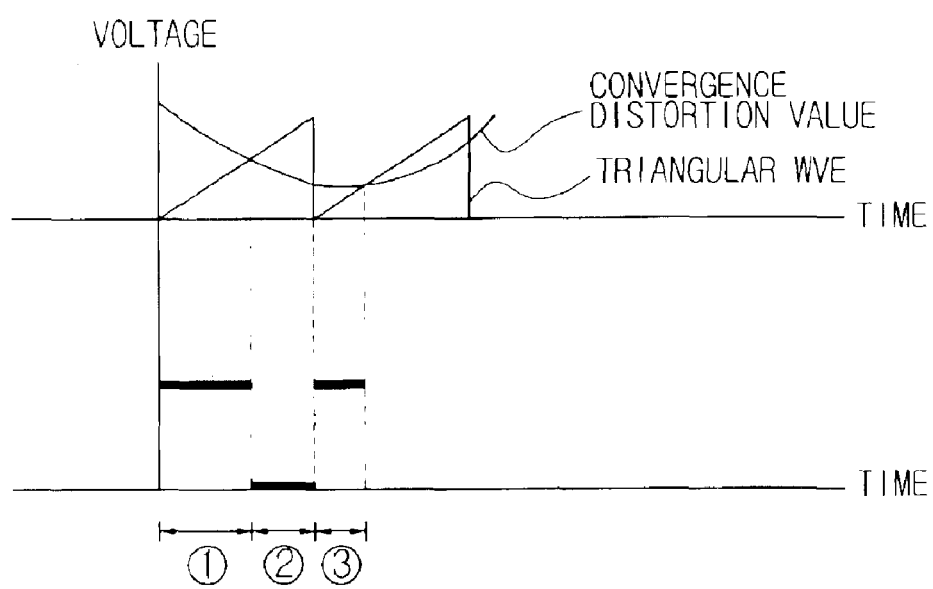
FIG. 6A is a view for illustrating a working principle of the comparator of FIG. 5.
Figure 6B:
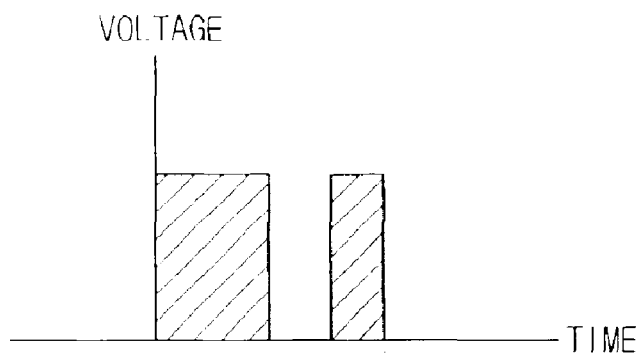
FIG. 6B is a view illustrating an output waveform of the pulse wave generator.

FIG. 6A is a view illustrating a working principle of the comparator 54 shown in FIG. 5, and FIG. 6B is a view illustrating an output waveform of the pulse wave generator 55.

As shown in FIG. 6A, in regions (1) and (3), the phase level of the convergence distortion value is higher than the triangular wave, while in region (2), the convergence distortion value is equal to, or smaller than the triangular wave. As the voltage signal is applied to the pulse wave generator 55, as shown in FIG. 6B, the pulse wave generator 55 generates a pulse width modulating signal having a predetermined periodicity and amplitude in accordance with the comparison result of the comparator 54.

Figure 7A:
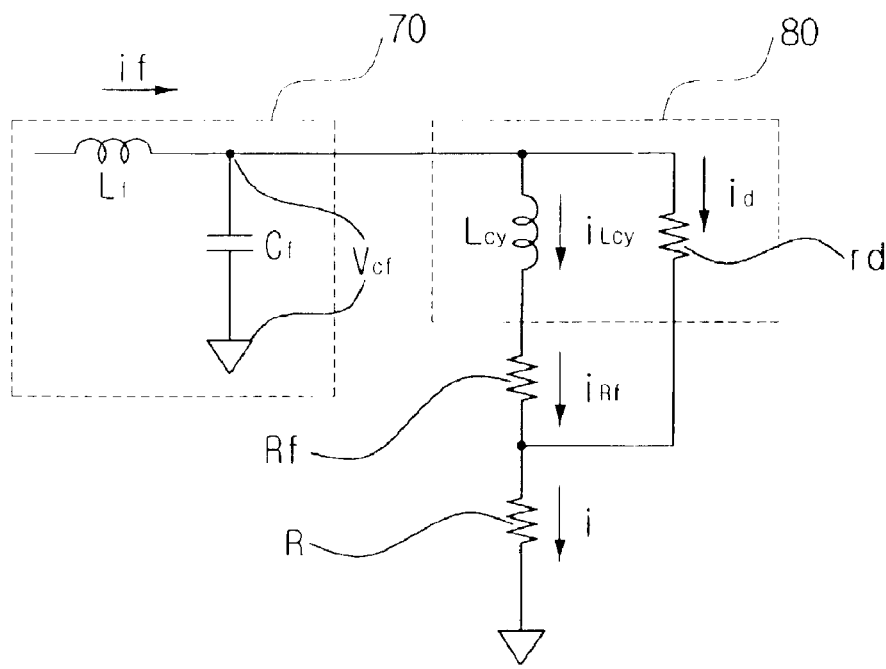
FIG. 7A is a view illustrating a plant, an object of controlling by the combiner of FIG. 5.
Figure 7B:
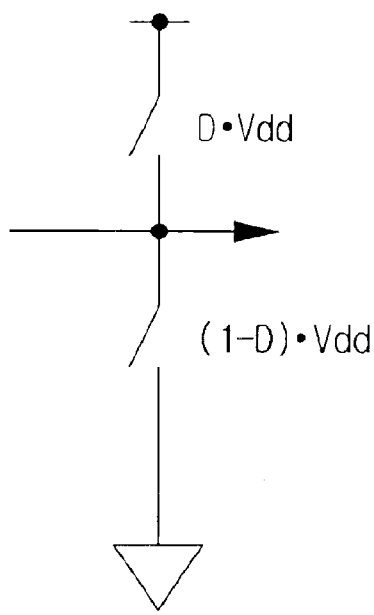
FIG. 7B is a view modeling the D-class amplifier.

FIG. 7A illustrates an object of the controlling by the comparator 53 of FIG. 5, i.e., illustrates a plant, and FIG. 7B models the D-class amplifier 60.

In the image distortion compensating apparatus according to the present invention, the D-class amplifier 60, the low-pass filter (LPF) 70, and the convergence yoke 80 correspond to the plant. Because the D-class amplifier 60 has a power-switching function only, the LPF 70 and the convergence yoke 80 are modeled first, and then the D-class amplifier 60 will be mentioned later. Assuming that the LPF 70 corresponds to a combination of a coil Lf connected in series with an output end of the D-class amplifier 60 and a capacitor Cf connected between the output end and a ground of the coil Lf, the plant is comprised of the coil Lf, the capacitor Cf, a convergence yoke coil Lcy connected in series between the output end and the ground of the coil Lf, and a resistor rd which is connected with the resistors Rf and R, and a node connected with the coil Lf and the convergence yoke coil Lcy. The coil Lf and the capacitor Cf are represented by modeling the LPF 70, and the resistor Rf represents the resistor 91, the resistor R the resistor 92, and the resistor rd the damping resistor 82 for consuming the magnetic energy accumulated at the yoke coil 81.

The purpose of modeling the plant is to obtain gains and phase characteristics of the convergence yoke coil Lcy. In order to obtain gains and phase characteristic of the convergence yoke coil Lcy, first, voltage and electric current of the capacitor Cf and the coil Lf, and current variation at the convergence yoke coil Lcy, all three of which influence the gains and phase characteristics of the convergence yoke coil Lcy, are obtained. Next, the elements that can vary the electric current iLcy flowing in the convergence yoke coil Lcy, i.e., the object of the modeling, such as electric current variation of the coil Lf per time unit (dif/dt), electric current variation of the convergence yoke coil Lcy per time unit (diLcy/dt) and voltage variation (dVcf/dt) at both ends of the capacitor Cf, are obtained. Then, with the three equations as obtained, the gains and phase characteristics based on the frequency applied to the convergence yoke coil Lcy are analyzed by use of mathematical and engineering program tools such as matlab and the Bode diagram, and therefore, the comparator 53 is constructed based on the analysis made.

First, the process of obtaining electric current variation of the coil Lf per time unit is as follows.

Assuming the voltage applied to the coil Lf as Dvdd, because DVdd=Lf·dif/dt+Vcf, the electric current variation per time unit (dif/dt) is obtained by, $$\frac{dif}{dt} = \frac{DVdd}{Lf} - \frac{Vcf}{Lf} \qquad \text{[Equation 1]}$$

wherein the voltage Dvdd applied to the coil Lf has Vdd in accordance with a general periodicity D, if denotes an electric current flowing in the coil Lf, and Vcf denotes the voltage at both ends of the capacitor Cf.

Next, the electric current variation of the convergence yoke coil Lcy per time unit (diLcy/dt) is obtained by, $$Vcf = R \cdot i + id \cdot rd = id \cdot rd + R(id + iLcy) \qquad \text{[Equation 2]}$$

Rearrange Equation 2 gets, $$id = \frac{Lcy}{rd} \cdot \frac{diLcy}{dt} + \frac{Rf}{Rd} \cdot iLcy \quad \text{[Equation 3]}$$

wherein rd denotes a damping resistance for consuming the accumulated magnetic field at the convergence yoke coil Lcy, and id denotes an electric current flowing in the damping resistor.

Putting equation 3 in equation 2, and rearranging with respect to diLcy/dt gets, $$\frac{diLcy}{dt} = -\frac{(R+rd) \cdot Rf + rd \cdot R}{(R+rd)Lcy} \cdot iLcy + \frac{rd}{(R+rd)Lcy} \cdot Vcf \quad \text{[Equation 4]}$$

Next, in order to obtain electric current variation per time unit (dVcf/dt) at both ends of the capacitor Cf, first, the electric current iCf flowing in the capacitor Cf is obtained by, $$icf = Lf \cdot \frac{dVcf}{dt} = if - i = iRf - iLcy - ird, \quad \text{[Equation 5]}$$

because $$ird = -\left(\frac{1}{rd}\right)\frac{diLcy}{dt} \cdot Lcy + \frac{Rf}{rd} \cdot iLcy,$$

putting this in the equation 5 and rearranging with respect to dVcf/dt gets, $$Cf \cdot \frac{dVcf}{dt} = if - \left(1 + \frac{Rf}{rd}\right) \cdot iLcy - \frac{Lcy}{rd} \cdot \frac{diLcy}{dt}. \quad \text{[Equation 6]}$$

Because diLcy/dt is obtained by the equation 4, putting diLcy/dt in the equation 6 gets, $$\frac{dVcf}{dt} = \frac{1}{Cf} \cdot if - \frac{rd}{(R+rd) \cdot Cf} \cdot iLcy - \frac{1}{(R+rd)} \cdot Vcf \quad \text{[Equation 7]}$$

Converting the equations 1, 4 and 7 into a state equation gets, $$\begin{bmatrix} \frac{dif}{dt} \\ \frac{diLcy}{dt} \\ \frac{dVcf}{dt} \end{bmatrix} = \begin{bmatrix} 0 & 0 & \frac{1}{Lf} \\ 0 & \frac{Rf \cdot (R+rd) + R \cdot rd}{(R+rd) \cdot Lcy} & \frac{rd}{(R+rd) \cdot Lcy} \\ \frac{1}{Cf} & \frac{rd}{(R+rd) \cdot Cf} & \frac{rd}{(R+rd) \cdot Cf} \end{bmatrix} \begin{bmatrix} if \\ iLcy \\ Vcf \end{bmatrix} + \begin{bmatrix} \frac{1}{Lf} \\ 0 \\ 0 \end{bmatrix} + [Dvdd \ 0 \ 0] \quad \text{[Equation 8]}$$

The state equation 8 is about the modeling made without the consideration of the switching characteristic of the D-class amplifier 60. In other words, the equation 8 is about the high power model represented by modeling the D-class amplifier 60 in a manner of modeling an analogue linear amplifier. In order to convert the switching characteristics into small signal model, the equation 1 expressing the relation of the voltage Dvdd applied to the coil Lf is converted as, $$if = -\frac{Vcf}{Lf} \cdot d + \frac{(2D-1)Vdd}{Lf} \quad \text{[Equation 9]}$$

The equation 9 is the result of converting the electric current variation of the coil Lf per time unit as expressed in the equation 1, in consideration of the switching operation of the D-class amplifier 60.

Now, (2D−1)Vdd/Lf in consideration of the switching operation of the D-class amplifier 60 will be briefly explained.

Referring to FIG. 7B, assuming the output time of power Vdd to be D, the output time of a ground voltage Vss is 1−D. Subtracting the ground voltage output time Vss from the power output time Vdd, an output time of the power Vdd by the switching operation of the D-class amplifier 60 will be (D−(1−D)), i.e., 2D−1. Therefore, the final modeling in consideration of the switching operation of the D-class amplifier 60 can be obtained as follows by applying the equation 9 to the equation 8.

$$\begin{bmatrix} \frac{dif}{dt} \\ \frac{diLcy}{dt} \\ \frac{dVcf}{dt} \end{bmatrix} = \begin{bmatrix} 0 & 0 & \frac{1}{Lf} \\ 0 & \frac{Rf \cdot (R+rd) + R \cdot rd}{(R+rd) \cdot Lcy} & \frac{rd}{(R+rd) \cdot Lcy} \\ \frac{1}{Cf} & \frac{rd}{(R+rd) \cdot Cf} & \frac{1}{(R+rd) \cdot Cf} \end{bmatrix} \begin{bmatrix} if \\ iLcy \\ Vcf \end{bmatrix} + \begin{bmatrix} \frac{1}{Lf} \\ 0 \\ 0 \end{bmatrix}[Vdd] + \begin{bmatrix} \frac{2Vdd}{Lf} \\ 0 \\ 0 \end{bmatrix} \quad \text{[Equation 10]}$$

wherein the initial value vo is, $$vo = [0 \ 1 \ 0] \begin{bmatrix} if \\ iLcy \\ Vcf \end{bmatrix}$$

Figure 8:
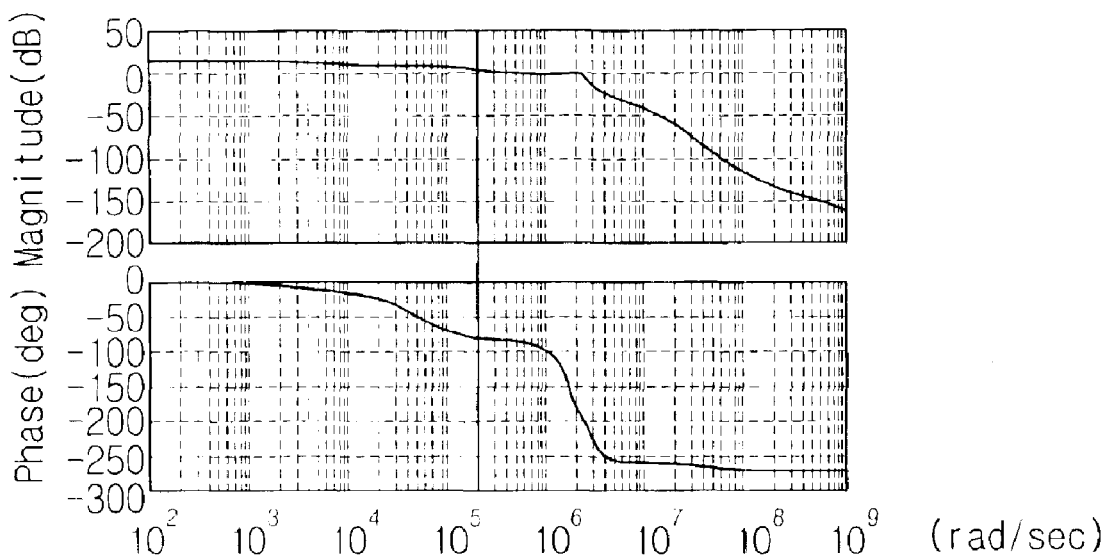
FIG. 8 is a Bode diagram illustrating the result of simulation with respect to an open loop characteristic of convergence yoke after input of a state equation into matlab.

With the above state equation 10 and the mathematical and engineering programs such as matlab, the Bode diagram can be obtained which shows the gain and phase characteristics as shown in FIG. 8. Each element put in the state equation 10 is as follows:

Lf=21.5 uH

Cf=17.5 pF

Lcy=60 uH rd=75Ω

R=4.7Ω

R=0.1Ω

More specifically, FIG. 8 illustrates the result of simulation on the open loop characteristic with respect to the convergence yoke 80 after the input of the above state equation 10 to matlab.

As shown in FIG. 8, there is an abrupt drop of gains in the region of $2 \times 10^6$ rad/s, in the frequency of 31.7 kHz, while the phase steeply drops in the lower frequencies. If the available frequency inputtable to the D-class amplifier 60 is $2 \times 10^6$ rad/s, such reduction in gains causes the response time of the combiner 53 for controlling the convergence yoke 80 to prolong. Furthermore, the deterioration in the phase characteristic also deteriorates the stability of the entire system. For example, if the phase drops to below −270°, the entire system, image distortion compensating apparatus in this instance, has oscillation. The phase graph of FIG. 8 has a phase margin of −180 in the region of $2 \times 10^6$ rad/s.

Figure 9:
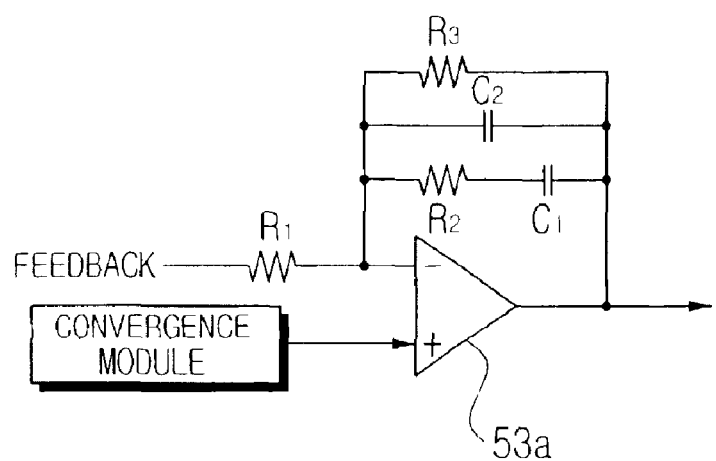
FIG. 9 is a view illustrating a combiner according to a preferred embodiment of the present invention.

FIG. 9 illustrates the combiner 53 according to a preferred embodiment of the present invention, which is constructed in consideration of the simulation result of FIG. 8, i.e., provided with two poles in 2000 rad/s and $10^6$ rad/s, and one zero in $2 \times 10^4$ rad/s.

The combiner 53 resolves the problems found in the simulation result of FIG. 8, i.e., the abrupt drop of gains in the frequency below $2 \times 10^6$ rad/s and also the abrupt drop of phase in the frequency below $2 \times 10^6$ rad/s. The combiner 53 is designed in consideration of the gains and phase characteristics of the convergence yoke 80 which are obtained by conducting a simulation of the state equation 10 through the mathematical and engineering programs such as matlab, such that the combiner 53 is designed to have planar gains and phase characteristics of the convergence yoke 80 until the frequency of $2 \times 10^4$ rad/s. More specifically, the combiner 53 is designed to have the pole to raise the gains in the frequency slightly below the point of gain drop such as 200 rad/s, the zero to maintain the gains and phase curves to be planar until the targeting frequency such as $2 \times 10^6$ rad/s, and another pole to reduce the gain in the undesired frequency such as the frequency exceeding $2 \times 10^6$ rad/s. The respective elements for obtaining the frequency characteristics until $2 \times 10^6$ rad/s are as follows:

$R1 = 40\ k\Omega$ $R2 = 220\ k\Omega$ $R3 = 180\ k\Omega$ $C1 = 220\ pF$ $C2 = 5\ nF$ Meanwhile, the input/output characteristics of the combiner 53a, i.e., the transfer function can be obtained with the impedance ratio of the input/output of the operational amplifier 53a. Accordingly, the impedance by the resistor R3 and the capacitor C2 connected between a negative input terminal and an output terminal of the operational amplifier 53a, and the impedance by the resistor R2 and the capacitor C1 connected in series between the negative input terminal and the output terminal of the operational amplifier 53a are obtained. Then the impedances are added, and the transfer function is obtained based on the sum as obtained.

First, the impedance by the resistor R3 and the capacitor C2 is obtained by, $$\frac{1}{Z1} = \frac{1}{R3} + SC2 \qquad \text{[Equation 11]}$$

To isolate Z1, the equation 11 is rearranged and gets, $$Z1 = \frac{R3}{1 + R3 C2 S}.$$

Next, the impedance Z2 by the resistor R2 and the capacitor C1 is, $$Z2 = R2 + \frac{1}{SC1} = \frac{R2 \cdot C1 S + 1}{SC1}.$$

Adding Z1 and Z2 gets, $$\frac{1}{Z(\text{total})} = \qquad \text{[Equation 12]}$$

$$\frac{1}{Z1} + \frac{1}{Z2} = \frac{(1 + R3 \cdot C2S)(R2 \cdot C1S + 1) + R3 \cdot C1S}{R3 \cdot R2 \cdot C1 S + R3}$$

The total impedance Z(total) is obtained by inverting the fractions of the Equation 12. Then, dividing Z(total) with the input resistance R1 will get, $$H(S) = \qquad \text{[Equation 13]}$$

$$\frac{Z3}{R1} = \frac{R3 \cdot R2 \cdot C1 S + R3}{R1 \cdot R2 \cdot R3 \cdot C1 \cdot C2 S^2 + (R1 \cdot R3 \cdot C2 + R1 \cdot R2 \cdot C1 + R1 \cdot R3 \cdot C1) S + R1}$$

Figure 10:
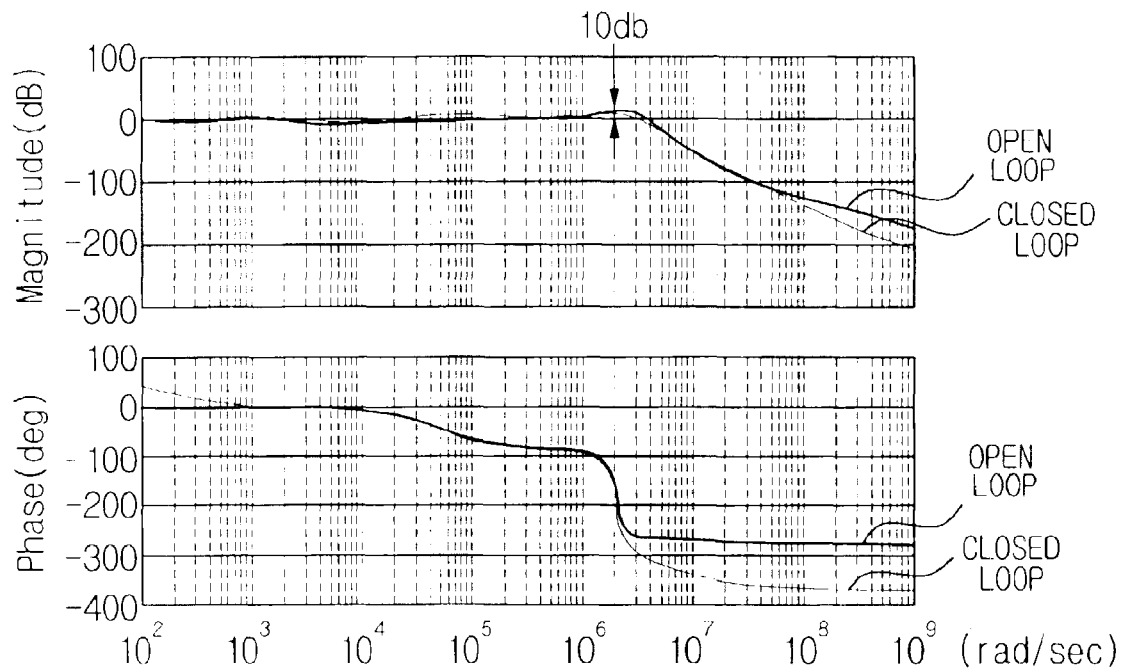
FIG. 10 is a Bode diagram illustrating a frequency characteristic of the combiner.

FIG. 10 is a Bode diagram illustrating the frequency characteristic of the combiner 53 having the transfer function of the equation 13.

As shown, until the frequency region of $2 \times 10^6$ rad/s, the closed loop gains improve approximately by 10 db as compared to the open loop gains, and also has planar frequency and gain characteristics. Further, the frequency of $10^9$ rad/s has phase difference of 90° between the open loop and closed loop. In other words, the closed loop has more phase margin than the open loop as much as 90°, and is more stable.

Figure 11:
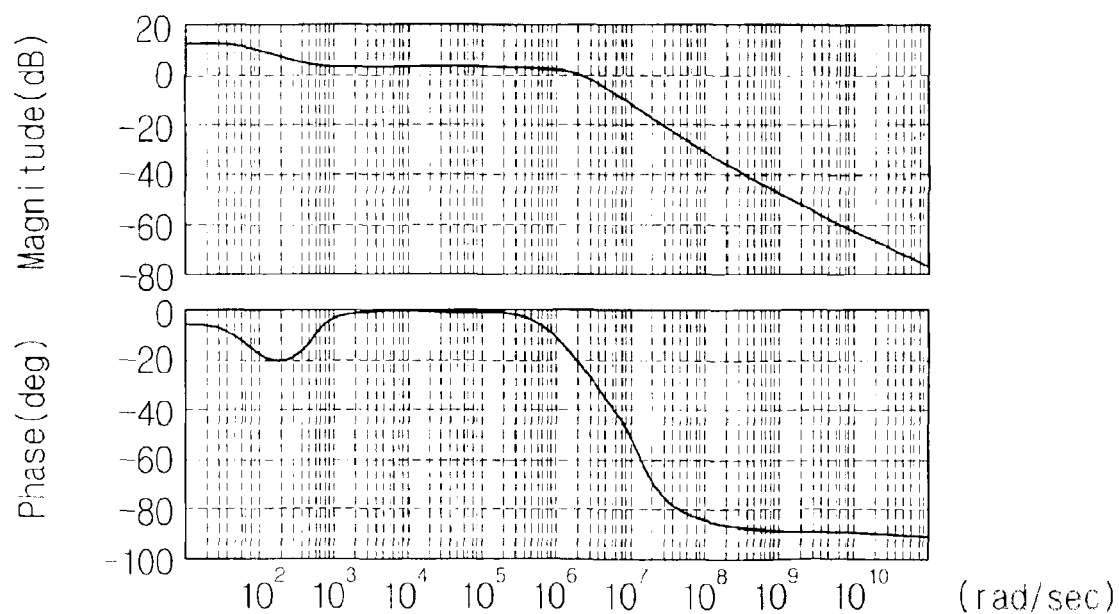
FIG. 11 is a Bode diagram illustrating a result of compensating with a transfer function by the feedback controller.

FIG. 11 is a Bode diagram showing the result of compensating based on the transfer function of the feedback controller.

As shown, the gains and phase characteristics of the convergence yoke 80 are properly compensated by the gains and phase characteristics of the combiner 53 according to the present invention so that there are planar gain characteristic until the frequency up to $2 \times 10^6$ rad/s. Although the phase characteristic is somewhat degraded in 2000 rad/s, the phase characteristics also maintain a rather planar relation until the targeting frequency, in this instance, $2 \times 10^6$ rad/s.

In this description, $2 \times 10^6$ rad/s has been assumed as the targeting frequency based on the fact that the frequency of the pulse up to $2 \times 10^6$ rad/s is applied to the D-class amplifier 60. However, it will be appreciated by those skilled in the art that the control targeting frequency may vary and the resistor and capacitor values also vary according to the varied targeting frequency.

Figure 12:
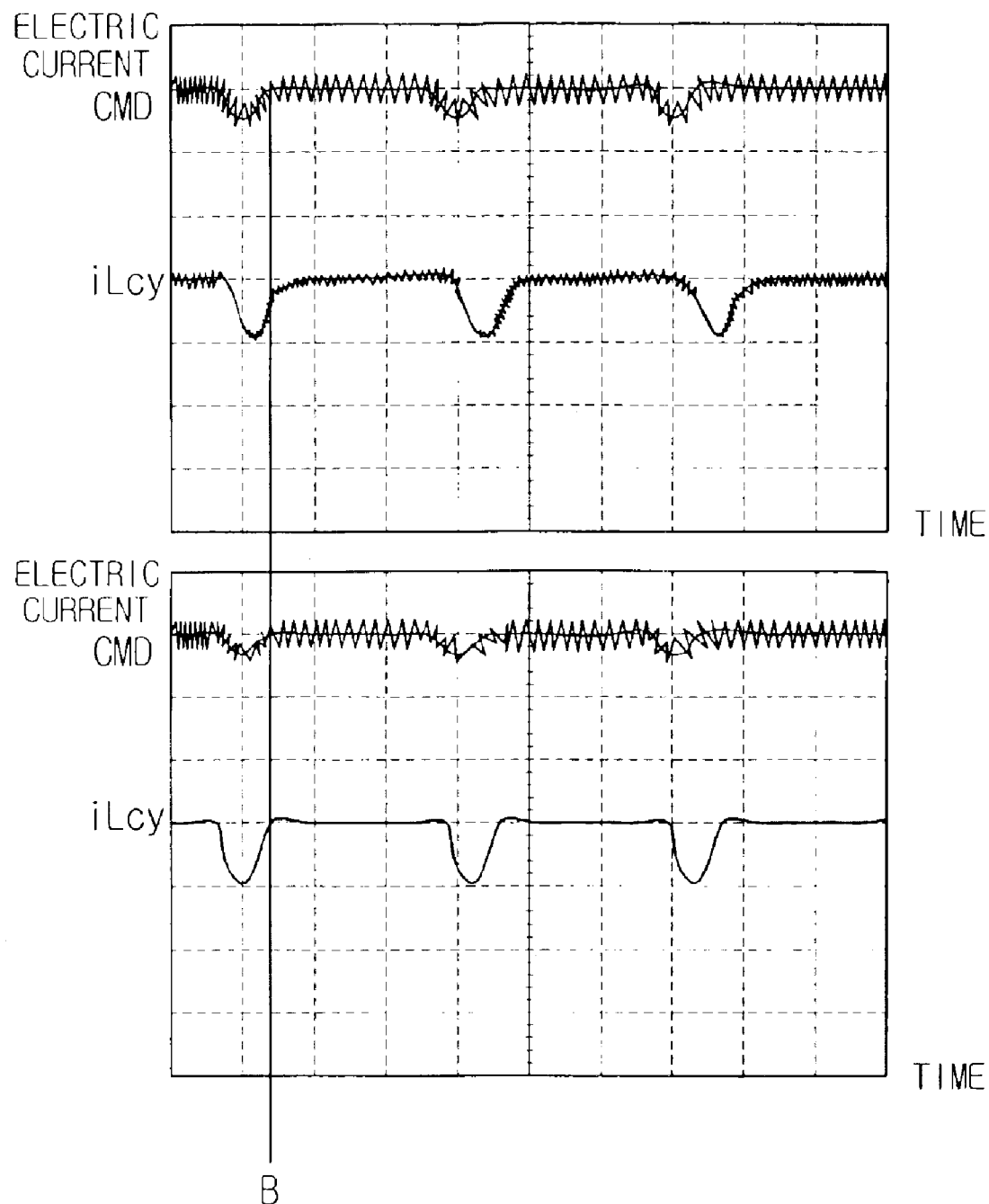
FIG. 12 is a view illustrating a comparison of the electric characteristic of the convergence yoke between two cases, one with the combiner and the other without.

FIG. 12 is a view illustrating a comparison of the electric characteristic of the convergence yoke coil 81 between two cases, one using the combiner 53 and the other without.

More specifically, the upper graph of FIG. 12 is for the case in which the combiner 53 is not used, and the lower graph is for the case in which the combiner 53 is used.

As shown, if the combiner 53 is not used, the waveform of the electric current in the B-zone is delayed as compared to the waveform of the electric current outputted from the convergence module 51, whereas, with the combiner 53 being in use, the waveform of the electric current in the B-zone is very similar to the waveform of the electric current outputted from the convergence module 51. This is because the pole is set in the frequency of 2000 rad/s in accordance with the above-described controlling method. Additionally, due to another pole set for the frequency $2\times10^6$ rad/s, the switching noise in the high frequency region is eliminated. As a result, the level of noise also decreases.

Figure 13:
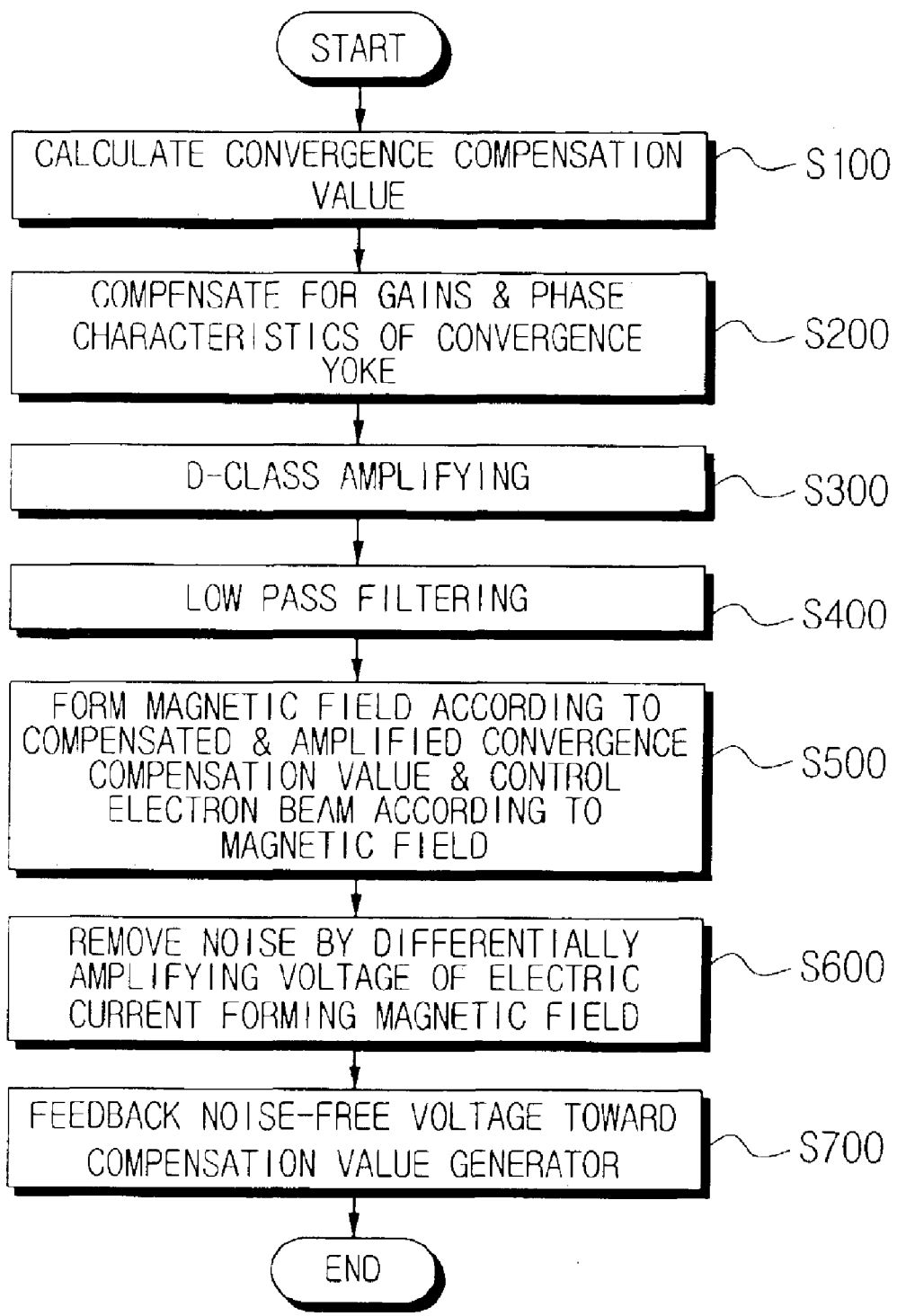
FIG. 13 is a flowchart illustrating an image distortion compensating method using an image distortion compensating apparatus according to the present invention.

FIG. 13 is a flowchart illustrating an image distortion compensating method using the image distortion compensating apparatus according to a preferred embodiment of the present invention.

First, a predetermined convergence distortion value is calculated from the convergence module 51, and a convergence compensation value having a pulse waveform is calculated based on the feedback value from the feedback sensor 90 (S100). Next, the convergence compensation value is compensated in consideration of the phase and gain characteristics of the convergence yoke 80 (S200). Then the D-class amplifier 60 performs D-class amplification with respect to the convergence compensation value of the pulse waveform (S300). By D-class amplifying the convergence compensation value, the image distortion compensating method according to the present invention has an amplification characteristic that accompanies low heat and high efficiency. Next, the amplified convergence compensation value is low-pass filtered in accordance with a predetermined value (S400). According to the filtered convergence compensation value, the convergence yoke 80 is driven to form a predetermined magnetic field, and accordingly, the path of electron beams from the CRT is controlled by the magnetic field (S500). Because the convergence compensation value applied to the convergence yoke 80 has considered the phase and gain characteristics of the convergence yoke 80 according to the switching output of the D-class amplifier 60, there is almost no switching delay due to the switching output of the D-class amplifier 60. Next, the voltage value of the electric current forming a magnetic field at the convergence yoke coil 81 is obtained, and differentially amplified, thus having the noise removed from the electric current (S600). Lastly, the noise-free voltage value is fed back to the compensation value generator 50 (S700).

As described above, by employing the D-class amplifier 60, the image distortion apparatus according to the present invention achieves the goals of low heat generation and low power consumption, while providing the similar characteristics of the image distortion compensating apparatus that employs the conventional A-class amplifier.

In conclusion, according to the present invention, a D-class amplifier with high power efficiency and low heat generation is provided to the image distortion compensating apparatus used in the image display apparatus such as projection television, while through the two-pole and one-zero control method, the switching delay and noise of the D-class amplifier is greatly reduced.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. An image distortion compensating apparatus which controls a convergence yoke, comprising:

a compensation value generator for calculating a convergence compensation value for compensating a convergence distortion which occurs while an image signal is emitted onto a display apparatus, the compensation value generator outputting the convergence compensation value after compensating for a phase and a gain of the convergence yoke;

an amplifier of a D-class for amplifying the convergence compensation value;

a convergence yoke for controlling a path of electron beams corresponding to the image signal, based on the convergence compensation value as amplified at the amplifier; and a feedback sensor provided between the convergence yoke and the compensation value generator, for reducing a noise outputted from the convergence yoke through a differential amplification.

2. The image distortion compensation apparatus of claim 1, wherein the compensation value generator comprises:

a convergence module for synchronization to a horizontal synchronization signal and a vertical synchronization signal applied to the display apparatus and outputting a predetermined convergence distortion value;

a triangular wave generator for generating a triangular wave;

a combiner for combining the convergence distortion value and an output from the feedback sensor;

a comparator for comparing the convergence distortion value outputted from the combiner with a phase level of the triangular wave; and a pulse generator for generating the convergence compensation value in a form of a pulse width modulating signal based on the comparison result from the comparator.

3. The image distortion compensating apparatus of claim 2, wherein the combiner comprises:

a first resistor for being inputted with an output from the feedback sensor;

an operational amplifier for being inputted with an output from the first resistor as a negative input and the convergence distortion value as a positive input;

a second resistor and a first capacitor, both of which are connected in series between a negative input terminal and an output terminal of the operational amplifier; and a second capacitor and a third resistor, both of which are connected in parallel between the negative input terminal and the output terminal of the operational amplifier.

4. The image distortion compensating apparatus of claim 3, wherein the combiner has a transfer function of $$H(S) = \frac{Z3}{R1} = \frac{R3 \cdot R2 \cdot C1S + R3}{R1 \cdot R2 \cdot R3 \cdot C1 \cdot C2S^2 + (R1 \cdot R3 \cdot C2 + R1 \cdot R2 \cdot C1 + R1 \cdot R3 \cdot C1)S + R1},$$

where R1 is a resistance of the first resistor, R2 is a resistance of the second resistor, R3 is a resistance of the third resistor, C1 is a capacitance of the first capacitor, C2 is a capacitance of the second capacitor, and Z3 is a total impedance of the combiner.

5. The image distortion compensating apparatus of claim 4, wherein the transfer function of the combiner has a control characteristic of 2-pole and 1-zero.

6. The image distortion compensating apparatus of claim 5, further comprising a low pass filter provided between the amplifier and the convergence yoke, for reducing the noise of the amplifier by a predetermined amount.

7. An image distortion compensating method for controlling a convergence yoke, comprising the steps of:

calculating a convergence compensation value for compensating a convergence distortion which occurs while an image signal is emitted onto a display apparatus in consideration of a phase and a gain of the convergence yoke;

D-class amplifying in response to the convergence compensation value;

forming a predetermined magnetic field by the D-class amplification, and controlling a path of electron beams corresponding to the image signal by the magnetic field as formed; and sensing an output of the convergence yoke and removing a noise from the convergence yoke output through a differential amplification.

8. The image distortion compensating method of claim 7, wherein the step of D-class amplifying further comprises a step of low pass filtering the amplified convergence compensation value.

* * * * *